United States Patent [19]

Keen

[11] Patent Number: 4,958,841

[45] Date of Patent: Sep. 25, 1990

[54] GARMENT HANGER CADDY CART

[76] Inventor: Cletus F. Keen, 2736 S. Punta Del Este Dr., Los Angeles, Calif. 91745

[21] Appl. No.: 371,066

[22] Filed: Jun. 26, 1989

[51] Int. Cl.⁵ .............................................. B62B 3/10
[52] U.S. Cl. .................... 280/47.35; 211/13; 211/162; 280/79.3
[58] Field of Search ............ 280/47.35, 79.3, 79.7, 280/47.34; 211/13, 162

[56] References Cited

U.S. PATENT DOCUMENTS

| | | | |
|---|---|---|---|
| 2,454,858 | 11/1948 | Burt | 211/49 |
| 2,593,472 | 4/1952 | McGinn | 211/13 |
| 2,918,174 | 12/1959 | Tabbi | 211/49 |
| 3,064,992 | 11/1962 | Hoof | 280/79.3 |
| 3,661,268 | 5/1972 | Boley | 211/49 R |
| 3,692,188 | 9/1972 | Bayne | 211/49 D |
| 4,119,208 | 10/1978 | Acker | 211/162 |
| 4,424,905 | 1/1984 | Keen | 211/49 R |
| 4,518,088 | 5/1985 | Passoni | 211/13 |

FOREIGN PATENT DOCUMENTS 1571488  6/1969  France ................... 280/79.3

*Primary Examiner*—Richard A. Bertsch
*Assistant Examiner*—Eric Culbreth
*Attorney, Agent, or Firm*—Fleit, Jacobson, Cohn, Price, Holman & Stern

[57] ABSTRACT

A two tier cart is provided or rectangular plan shape for supporting a plurality of garment hanger caddies therefrom with upper loop portions of each caddy engaged over a support hook on the cart and the lower base portion of each caddy enbracingly received between and supported from laterally spaced part horizontally and upwardly opening angle members extending longitudinally of the cart. The lower portion the cart includes caster wheel assemblies and the cart therefore may be readily maneuvered through different retail store clothing department areas and transported by truck between stores and distribution centers.

9 Claims, 2 Drawing Sheets ately positioned and filled hanger caddys from sur-
GARMENT HANGER CADDY CART

BACKGROUND OF THE INVENTION

1. Field of the Invention

This invention relates to a cart specifically designed to support a plurality (16) of hanger caddies such as the garment hanger caddy disclosed in my prior U.S. Pat. No. 4,424,905. In this manner, the cart will be capable of supporting over one thousand hangers and such a large number of hangers may be readily transported from one location to another.

2. Description of Related Art

Various different forms of carts heretofore have been provided specifically designed to support a plurality of hangers therefrom. Examples of these previously known forms of carts are disclosed in U.S. Pat. Nos. 2,454,858, 2,918,174, 3,064,992, 3,661,268, 3,692,188 and 4,424,905. However, these previously known forms of carts are not specifically designed for use in conjunction with a plurality of hangers caddies.

The provision of a cart positionable in a central location and to which filled hanger caddies may be carried from different surrounding department locations greatly facilitates the handling of a large number of hangers.

Each department location may have one or two hangers caddies assigned thereto and the hanger caddies may be gradually filled with hangers. Then, on a predetermined schedule, the hanger cart may be advantageously positioned and filled hanger caddys from surrounding department locations may be carried to and placed upon the cart while at the same time empty garment hangers may be removed from the cart and carried back to the surrounding department locations. In this manner, various retail clothing outlets and other establishments utilizing numerous hangers may readily store hangers in an efficient manner, collect used hangers and thereafter transport used hangers back to the manufacturer or distribution center.

SUMMARY OF THE INVENTION

There long has been a problem of efficiently handling large volumes of hangers in large retail stores and between the retail stores and distribution centers where fashion goods are rehangered for shipment back to retail stores. As noted above, different forms of carts have been designed for receiving small numbers of empty hangers thereon and such carts may be transported within retail stores. However, these previously known forms of hanger carts are relatively large and cumbersome and, therefore, may not be readily strategically positioned in various retail store clothing department areas. Consequently, retail store clothing department areas conventionally place used hangers in random manner within boxes provided therefor in different clothing department areas and these boxes, when filled, are carried to a central location and shipped to the distribution center, where the hangers within the boxes are then individually removed therefrom and resorted into boxes and in a predetermined orderly manner, after which the fashion goods may be re-hangered thereon for shipment to the retail store.

Obviously, this manner of handling empty hangers is excessively time consuming and often results in appreciable hanger breakage.

In order to handle empty hangers more efficiently, the cart of the instant invention is designed to be used in conjunction with hanger caddies of the type disclosed in my prior U.S. Pat. No. 4,424,905. Each retail store clothing department area may have 1 or 2 hanger caddies disposed therein and these hanger caddies may be used to automatically accumulate empty hangers in an orderly manner. Then, when the various hanger caddies are substantially full, the cart of instant invention may be moved to the different retail store clothing department areas full of empty hanger caddys and the full hanger caddies from each retail store clothing department area may be placed upon the cart while at the same time empty hanger caddies are removed from the cart and positioned as desired in the clothing department areas from which the full hanger caddies were removed.

This manner of collecting empty hangers preparatory to their shipment back to a clothing distribution center may be carried by a single person and in a relatively short period of time without that person having to individually handle each hanger to be loaded upon the cart.

The main object of this invention is to provide a cart specifically designed to support a large number of hanger caddies thereon and wherein the hanger caddies to be used in conjunction with the cart each may have a large number of empty hangers gradually accumulated thereon in an orderly manner.

Another object of this invention is to provide a cart for hanger caddies and of a configuration enabling the cart to be readily maneuvered through various clothing department areas.

Still another object of this invention is to provide a hanger cart from which empty hanger caddies may be readily removed and upon which full hanger caddies may be placed and secured in position thereon.

Another object is to provide a cart upon which a plurality of caddies, each supporting numerous hangers in orderly fashion, may be readily removably hook supported.

A final object of this invention to be specifically enumerated herein is to provide a garment hanger caddy cart which will conform to conventional forms of manufacturing, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
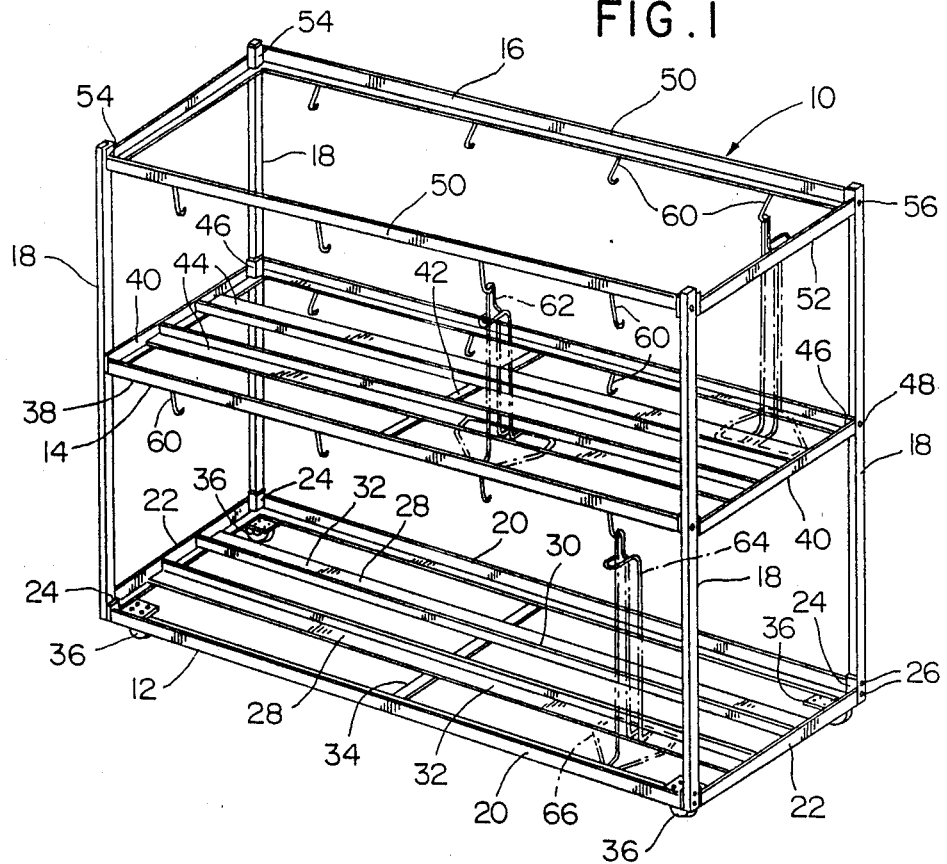
FIG. 1 is a perspective view of the cart of the instant invention and with a plurality of associated hanger caddies operatively associatad therewith and illustrated in phantom lines.
Figure 2:
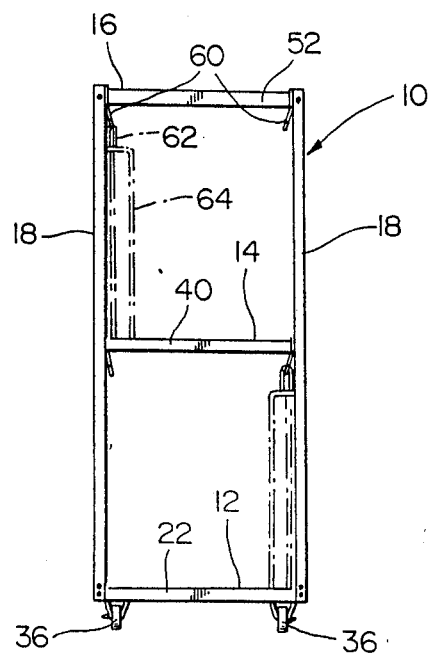
FIG. 2 is an end elevational view of the cart as seen from the right side of FIG. 1.
Figure 3:
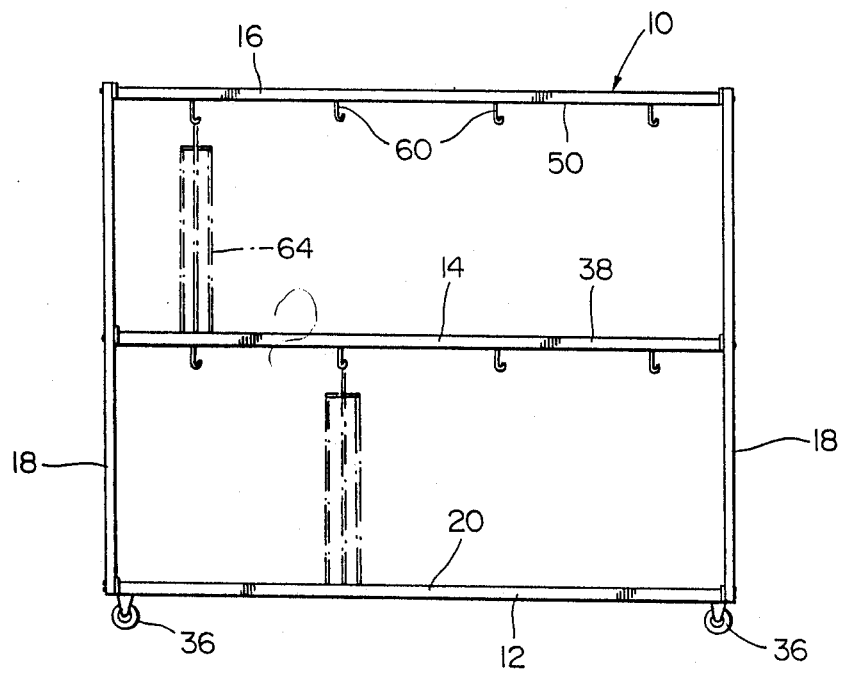
FIG. 3 is a front elevational view of the cart.
Figure 4:
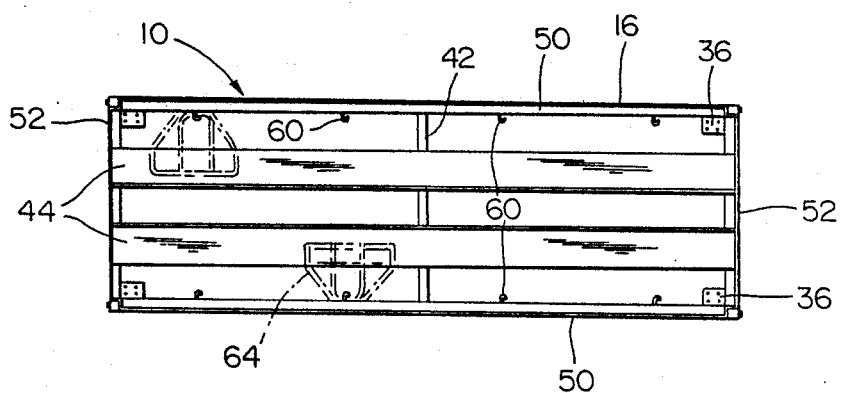
FIG. 4 is a top plan view of the cart.
Figure 5:
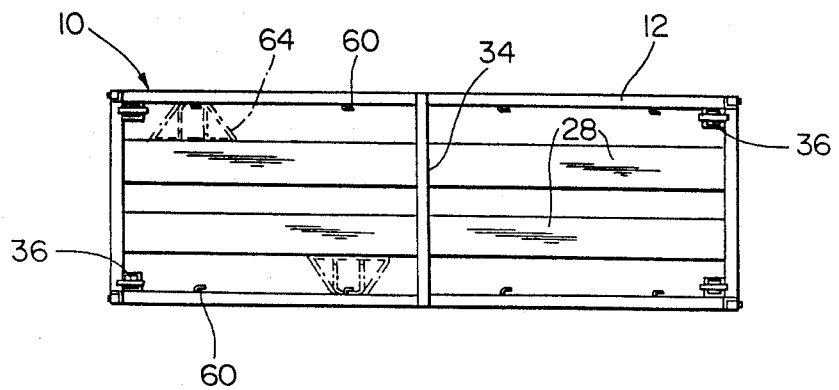
FIG. 5 is a bottom plan view of the cart.

Referring now specifically to drawing the numeral 10 generally designates the cart of the instant invention. The cart 10 includes a rectangular lower frame 12, an intermediate height frame 14 and a upper frame 16, the frames 12, 14 and the 16 being interconnected by four corner uprights 18.

The lower frame 12 includes a pair of elongated, longitudily extending, laterally spaced apart and upwardly and inwardly opening lower opposite side angle members 20 and pair of transverse, upwardly and inwardly opening low end angle members 22 between whose corresponding ends the angle members 20 extend and are secured. The intersections between adjacent ends of each pair of peripherally adjacent members 20 and 22 define outwardly opening 90 degree notches in which angle members 24 are secured and the lower end of each upright 18 is secured in the corresponding angle member 24 through the utilization of a pair of fasteners 26.

The lower frame 12 also includes a pair of second elongated, longitudily extending and upwardly and outwardly opening angle members 28 extending between and supported from longitudinal mid-portions of the transverse end members 22 and the angle members 28 are laterally spaced apart. Further, the angle members 28 include relatively vertically short upstanding flanges 30 and appreciably wider horizontal flanges 32. Finally, the longitudinal mid-portions of the angle members 20 are interconnected through the utilization of a transverse brace 34 extending therebetween and to which the longitudinal mid-portions of the angle members 28 also are secured any convenient manner and the four corner portions of the lower frame 12 each support a caster wheel assembly 36 therefrom.

The intermediate height frame 14 includes a pair of inwardly and upwardly opening angle members 38 corresponding to the angle members 20, a pair of transverse end members 40 corresponding to the end members 22, a transverse brace 42 corresponding to the transverse brace 34 and laterally spaced apart upwardly and outwardly opening angle members 44 corresponding to the angle members 28. Further, the intermediate height frame 14 includes angle members 46 corresponding to the angle members 24 and single fasteners 48 corresponding to the fasteners 26 are used to secure the mid height portions of the uprights 18 to the corresponding angle members 46.

The upper frame 16 includes opposite side longitudinal angle members 50 corresponding to the angle members 20 and 38, transverse opposite end angle members 52 corresponding to the end members 22 and 40 and corner angle members 54 corresponding to the corner angle members 24 and 46. The upper ends of the uprights 18 are secured to the angle members 54 through the utilization of single fasteners 56 corresponding to the fasteners 26 and 48. Also, it will noted that each of the angle members 38 and 50 includes a plurality of downwardly and inwardly inclined hooks 60 supported therefrom, the hooks 60 opening upwardly and outwardly and being adapted to have the upper loop portions 62 of garment hanger caddies 64 engaged therewith and the base portions 66 of the garment hanger caddies 64 being adapted to be received upon each pair of opposing angle members 20 and 28 of lower frame 12 and the angle members 38 and 44 of the intermediate height frame 14.

As herein before set forth, a single cart 10 may be stored in a convenient out of the way location in a retail outlet and have 16 empty garment hanger caddies 64 supported thereon. Thereafter, when individual garment hanger caddys 64 disposed in different clothing department areas are at least substantially full of used hangers, the cart 10 may be moved through the different retail clothing department areas and the person handling the cart may then remove an empty garment hanger caddy 64 from the cart 10 for each hanger caddy which is substantially full of used hangers in each retail clothing department area and exchange empty garment hanger caddies 64 for the full garment hanger caddies and thereafter place the full garment hanger caddies 64 on the cart 10.

As soon as the cart 10 has been filled with garment hanger caddies 64 substantially filled with used hangers, the cart 10 may be shipped back to the clothing distribution center. At the clothing distribution center the used hangers may be quickly removed from the garment hanger caddies 64 on the cart 10 and stored in an orderly manner for re-hanging clothing thereon and the cart 10 and empty garment hanger caddies 64 may be returned to the retail clothing store.

The foregoing is considered as illustrative only of principles of the invention. Further, since numerous modification and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A cart for supporting and transporting a plurality of hanger caddies of the type including lower horizontal base portions having front and rear margins and upper loop portions, said cart including a horizontally elongated lower frame incorporating a pair of first elongated, longitudinally extending, laterally spaced apart and upwardly and inwardly opening lower angle members, a pair of transverse low end members extending between and interconnecting the corresponding ends of said angle members, a pair of second elongated, longitudinally extending and upwardly and outwardly opening angle members extending between and supported from longitudinal mid-portions of said transverse end members and spaced inwardly of said pair of first angle members, said cart also including two pairs of opposite end corner uprights between lower portions of which said lower angle members and low end members extend are secured, a pair of opposite side, horizontally elongated, longitudinally extending and laterally spaced apart upper side members supported from and extending between upper portions of said corner uprights above said first lower angle members and a pair of upper transverse end members supported from and extending between said upper portions of the corresponding opposite end uprights, said upper side members each including downwardly projecting and upwardly opening hook members spaced longitudinally therealong over which to engage the loop portions of hanger caddies having their base portions supported from, spanning between and spaced along the corresponding first and second angle members of said cart.

2. The cart of claim 1 wherein said upper side members comprising upwardly and inwardly opening third angle members and said cart includes a pair of uppermost longitudinal side members extending between and supported from upper end portions of corresponding corner uprights, a pair of elongated and upwardly and outwardly opening fourth angle members extending between and supported from longitudinal mid-portions of said upper transverse end members and spaced inwardly of said upper side members, said uppermost side members including downwardly projecting and upwardly opening hook members spaced longitudinally thereof over which to engage the loop portions of upper garment hanger caddies having their base portions supported from and spanning between the corresponding upper side members and fourth angle members.

3. The cart of claim 2 wherein said fourth angle members are laterally spaced apart.

4. The cart of claim 2 wherein said second angle members and fourth angle members each include integral horizontal and upright flanges and said horizontal flanges are substantially transversely wider than the height of said upright flanges.

5. The cart of claim 4 wherein said cart lower frame includes dependingly supported ground engageable wheel means.

6. The cart of claim 4 wherein said second and fourth angle members are laterally spaced apart.

7. The cart of claim 1 wherein said second angle members are laterally spaced apart.

8. The cart of claim 1 wherein said cart lower frame includes dependingly supported ground engagable wheel means.

9. The cart of claim 1 wherein said second angle members each include integral horizontal and upright flanges and said horizontal flanges are substantially transversely wider than the vertical extent of said upright flanges.

* * * * *